Patented Mar. 18, 1952

2,590,046

UNITED STATES PATENT OFFICE 2,590,046

EMULSIFYING AGENTS

Henry Dawid Schoenfeld, Mitcham, England, assignor to Benninga (Mitcham) Limited, Mitcham, England No Drawing. Application April 29, 1949, Serial No. 90,554. In Great Britain May 6, 1948

6 Claims. (Cl. 99—123)

This invention relates to emulsifying agents and to processes and compositions in which or in the preparation of which emulsifying agents are used.

The new products are particularly useful as additions for the manufacture of margarine and in the preparation of cakes with a higher content of sugar, like pound cakes, etc.

In the complete specification of my co-pending application for Letters Patent No. 90,555 I describe and claim a method of preparing bodies adapted to be used as emulsifying agents by effecting the partial esterification of polyhydric alcohols with higher polyhydroxy fatty acids and products and processes in which such emulsifying agents are used.

The hydroxy higher fatty acids undergo easily molecular re-arrangement when subjected to a high temperature whereby they are converted into so-called internal anhydrides or estolides, water splitting off.

For instance, ricinoleic acid and its hydrogenation product, 12-hydroxystearic acid, are easily converted at higher temperatures by internal anhydrisation, splitting off one molecule of water from the hydroxyl group of one molecule, and the carboxylic group from another molecule of the hydroxy acid, under formation of estolides:

$$2HOC_{17}H_{34}COOH - HOC_{17}H_{34}COOC_{17}H_{34}COOH + H_2O$$
Hydroxystearic acid Di(hydroxystearic) acid By prolonged heating of 12-hydroxystearic acid at a temperature of 180 to 200° estolides can be obtained whose composition corresponds to a hexa-12-hydroxystearic acid.

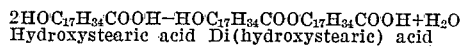

(H. Schoenfeld, Chemie und Technologie der Fette und Fettprodukte, vol. 1, p. 292, Vienna 1936.)

A similar reaction takes place when di- or trihydroxystearic acid and other polyhydroxy fatty acids are subjected to higher temperatures. The acid value of the hydroxy acid decreases as the degree of anhydrisation increases, increasing thus the molecular weight of the estolised product, as seen from the following examples:

9,10-dihydroxystearic acid, acid value 167.9 was heated at 180° C. The acid value dropped after—
 20 minutes of heating to 160.1
 50 minutes of heating to 144.8
 90 minutes of heating to 120.9

The converted acids are considerably softer than the original di- or trihydroxystearic acid.

Such estolised acid can be converted into partial esters of polyhydric alcohols such as glycerol, by methods generally as described in the specification of my co-pending application No. 90,555.

The invention consists in the process of producing bodies adapted to be used as emulsifying agents by subjecting the polyhydroxy fatty acids, for instance, dihydroxystearic acid, trihydroxystearic acid or the hydroxyacids obtained by hydroxylation of the total castor oil acids, and so on, to heat treatment whereby they are converted into estolides and thereafter partially esterifying the internal anhydrides or estolides of the acids with polyhydric alcohols.

The invention further consists in products obtained by baking mixtures containing cereal flour or meal and the partial esters of polyhydroxy alcohols and the internal anhydrides or estolides such as may be obtained in accordance with the invention, and the process of producing baked products which comprises incorporating such partial esters with other ingredients used in forming baked products.

The invention also consists in dispersions and emulsions containing as emulsifying agents such partial esters.

The invention consists in particular in margarine and other dispersions containing as emulsifying agents such partial esters as above defined.

The following particulars are given by way of example to illustrate the production of such partial esters:

Example I 30 parts of glycerol
0.8 part of sodium glyceroxide
30 parts of a partly estolised dihydroxy-stearic acid, acid value 144.8 were heated for 70 minutes at 196–198° C. in an atmosphere of an inert gas, while stirring vigorously.

The reaction product was worked up in a similar way as described in the examples given in the specification of my co-pending application for Letters Patent No. 90,555.

The product had the acid value of 10.9 saponification value 157.0.

Example II 30 parts of dihydroxystearic acid, the acid value of which had been reduced to 110.3 by heating at 180° C.
30 parts glycerol
0.3 part of sulphuric acid 1.84 were heated in 200 parts of dioxan, to boiling point for four hours while stirring and using anhydrous calcium sulphate (Dryerite) as a trap for the water entrained by the condensed solvent (reflux).

The glycerol separates from the solution as a layer while standing overnight.

The product emulsifies easily with water.

This behavior of the partly estolised polyhydroxy fatty acids provides a great possibility for balancing the hydrophilic and lipophilic powers within the molecule of their partial esters with polyhydric alcohols.

In using the partial esters they are incorporated in known manner with other ingredients used in forming baking mixtures or with other bodies to be emulsified.

I claim:

1. An emulsifying agent comprising a partial ester of a polyhydric alcohol with an estolised polyhydroxy higher fatty acid.

2. An emulsifying agent as set forth in claim 1, wherein said acid is selected from the group consisting of 9:10 di-hydroxy stearic acid and 9:10:12 tri-hydroxy stearic acid.

3. An emulsifying agent as set forth in claim 2, wherein said polyhydric alcohol is glycerol.

4. An edible baking mixture comprising cereal flour and a partial ester of a polyhydric alcohol with an estolised polyhydroxy higher fatty acid.

5. Dispersions and emulsions comprising as emulsifying agent a partial ester of a polyhydric alcohol with an estolised polyhydroxy higher fatty acid.

6. Margarine comprising as emulsifying agent a partial ester of a polyhydric alcohol with an estolised polyhydroxy higher fatty acid.

HENRY DAWID SCHOENFELD.

REFERENCES CITED

The following references are of record in the file of this patent:

UNITED STATES PATENTS

| Number | Name | Date |
|---|---|---|
| 2,024,356 | Harris | Dec. 17, 1935 |
| 2,132,416 | Harris | Oct. 11, 1938 |
| 2,132,701 | Richardson et al. | Oct. 11, 1938 |
| 2,156,737 | Priester | May 2, 1939 |